United States Patent
Burnett et al.

[15] 3,701,400
[45] Oct. 31, 1972

[54] PARKING ACTUATOR FOR DISC BRAKE

[72] Inventors: Richard T. Burnett; James J. Colpaert, both of South Bend, Ind.

[73] Assignee: Bendix Corporation

[22] Filed: Jan. 20, 1971

[21] Appl. No.: 107,967

[52] U.S. Cl. ............................ 188/72.6, 188/72.8
[51] Int. Cl. ................................... F16d 55/00
[58] Field of Search ............... 188/72.6, 72.7, 72.8

[56] References Cited

UNITED STATES PATENTS

| | | | |
|---|---|---|---|
| 3,404,756 | 10/1968 | Swift | 188/72.6 X |
| 3,489,251 | 1/1970 | Swift | 188/72.6 |
| 3,321,050 | 5/1967 | Press | 188/72.7 X |
| 3,365,031 | 1/1968 | Swift | 188/72.7 X |

FOREIGN PATENTS OR APPLICATIONS

| | | | |
|---|---|---|---|
| 1,090,835 | 11/1967 | Great Britain | 188/72.7 |

*Primary Examiner*—Richard E. Aegerter
*Assistant Examiner*—H. S. Lane
*Attorney*—Ken C. Decker and Plante, Hartz, Smith and Thompson

[57] ABSTRACT

A disc brake includes a rotor mounted for rotation with a member to be braked and a caliper slidably mounted on a fixed torque member. The caliper includes a housing defining a bore therewithin, and a piston is slidably mounted in the bore to urge friction elements disposed on opposite sides of the rotor into braking engagement with the latter when pressurized fluid is admitted into the bore during a brake application. A parking actuator is provided which includes a lever mounted within the caliper housing for rotation about an axis extending generally parallel to the axis of the rotor and for movement relative to the caliper along this axis. An elongated member interconnects the lever with the piston. Force transmitting elements are disposed between the lever and the end of the housing, so that when the lever is rotated, the force transmitting elements urge the latter toward the rotor. This axial movement is transmitted to the piston by the elongated member, to urge the piston toward the rotor, effecting a brake application.

5 Claims, 5 Drawing Figures

INVENTORS
RICHARD T. BURNETT
BY & JAMES J. COLPAERT

ATTORNEY

INVENTORS
RICHARD T. BURNETT
BY & JAMES J. COLPAERT

ATTORNEY

PARKING ACTUATOR FOR DISC BRAKE

BACKGROUND OF THE INVENTION

This invention relates to a disc brake.

Disc brakes possess many advantages over conventional drum brakes for use in automotive vehicles. However, disc brakes have not been widely accepted for use on all four wheels of automotive vehicles largely because it is very difficult to provide a simple and inexpensive parking actuator of a size small enough so that it can be used on a disc brake mounted in the rather crowded confines of a vehicle wheel.

SUMMARY OF THE INVENTION

Therefore, an important object of my invention is to provide a simple, yet effective, parking actuator for an automotive disc brake.

Another important object of my invention is to minimize the operator-applied actuating force necessary to operate a disc brake parking actuator.

Another important object of my invention is to provide a disc brake parking actuator of minimum size.

Another important object of my invention is to provide a parking actuator for a disc brake which can be manufactured at minimum cost.

DETAILED DESCRIPTION

Figure 1:
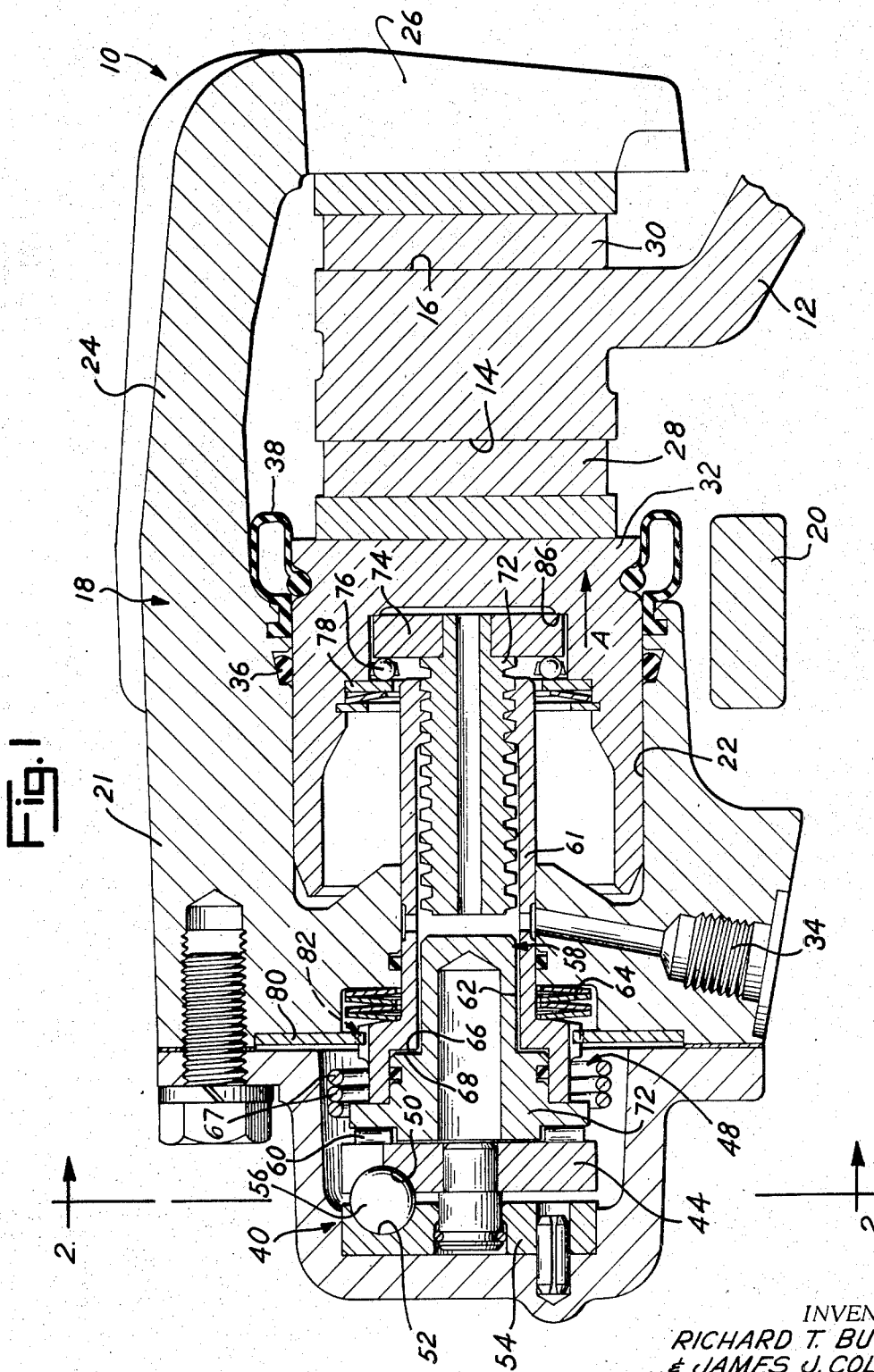
FIG. 1 is a cross sectional view of a disc brake made pursuant to the teachings of my present invention.

Referring now to the drawings, a disc brake generally indicated by numeral 10 includes a rotor 12 mounted for rotation with a member to be braked (not shown) and having a pair of opposed friction faces 14 and 16. A caliper generally indicated by the numeral 18 is slidably mounted on a fixed torque member 20 by any suitable means well known to those skilled in the art such as by pins as disclosed in U. S. Pat. No. 3,388,774, owned by the assignee of the present invention and incorporated herein by reference. The caliper 18 includes a housing 21 extending generally parallel to the friction face 14 and defining a bore 22 therewithin, a bridge portion 24 extending across the periphery of the rotor 12, and a radially inwardly extending portion 26 extending generally parallel to the other friction face 16. A pair of friction elements 28, 30, are operably connected to the caliper 18 and are disposed adjacent the friction faces 14 and 16, respectively.

A piston 32 is slidably mounted in the bore 22 for movement toward and away from the rotor 12 along an axis generally parallel to the axis of rotation of the latter. Pressurized fluid is admitted into the bore 22 through an inlet port 34 for operating the piston. The piston 32 is yieldably urged to the left viewing FIG. 1 after a brake application has been effected by a seal 36 which also prevents fluid from escaping from the bore 22 in a manner more completely disclosed in U. S. Pat. No. 3,377,076, owned by the assignee of the present invention and incorporated herein by reference. The usual boot 38 is provided to exclude contaminants from the bore 22.

Figure 2:
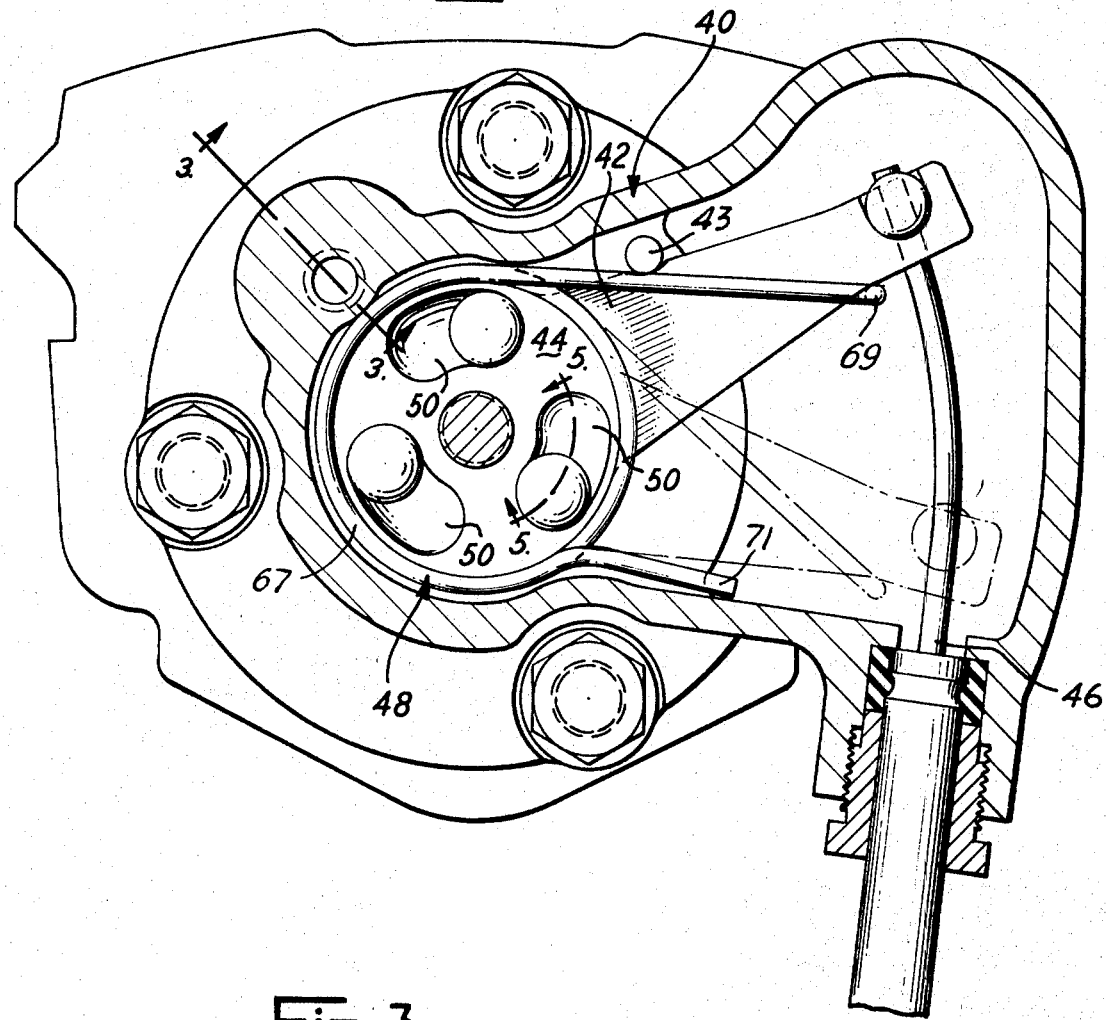
FIG. 2 is a cross sectional view taken along 2—2 of FIG. 1.
Figure 3:
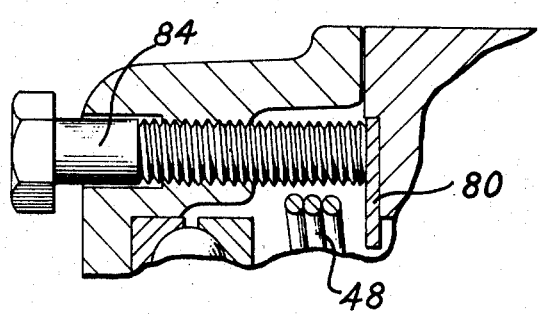
FIG. 3 is a cross sectional view taken along line 3—3 of FIG. 2.
Figure 5:
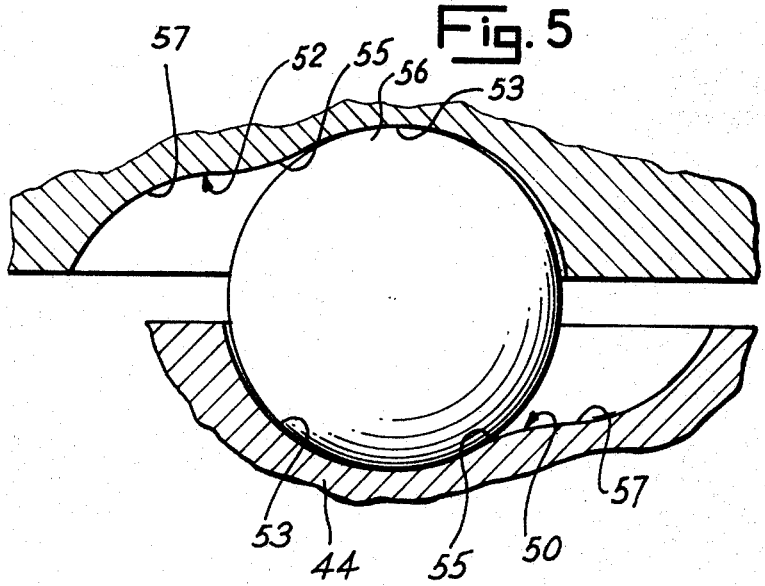
FIG. 5 is an enlarged cross sectional view taken along line 5—5 of FIG. 2.

A mechanical parking actuator is generally indicated by the numeral 40 and includes a lever 42 having a circular end 44. Lever 42 is mounted within the caliper 18 for rotation about the axis of the piston 32 and for movement along this axis, toward and away from the friction face 14. The lever 42 is rotatable from a first or brake released position indicated by the solid lines in FIG. 2 in which the lever 42 is urged against a stop 43 mounted in the caliper housing to a second or brake applied position indicated by the phantom lines in FIG. 2 by a cable 46 which extends from the caliper housing and is connected to the appropriate actuator (not shown) in the operator's compartment of the vehicle. A torsional spring indicated generally by the numeral 48 yieldably urges the lever 42 toward the first position. One side of the circular end 44 of the lever 42 is provided with spaced recesses 50 which are aligned with corresponding recesses 52 in a member 54 secured to the end of the housing 20. Although three such recesses are illustrated in FIG. 2, it will be clear to those skilled in the art that any suitable number of recesses 50 and 52 may be provided. As illustrated in FIG. 5, each of the recesses 50 and 52 includes a dish-shaped portion 53 in which spheres 56 normally rest when the parking actuator is released. A sharply sloping ramp surface 55 extends from one side of the dish-shaped portions 53 and merges with another ramp surface 57 having a lesser slope. The force transmitting elements or spheres 56 are disposed in each of the recess pairs 50 and 52, respectively.

An elongated member generally indicated by the numeral 58 is slidably mounted in the bore 22 for movement along the axis of the piston. Bearing means 60 are disposed between the end of the elongated member 58 and the other side of the end 44 of lever 42 to permit rotation of the latter with respect to the elongated member 58. The elongated member 58 includes an annular member 61 and a seat 62. Annular member 61 is urged into engagement with the seat 62 by a spring 64 which also urges the entire member 58 to the left viewing FIG. 1, toward the end 44 of the lever 42. The annular member 61 and the seat 62 are provided with larger and smaller diameter sections that present opposed shoulders 66 and 68 which define a small annular fluid cavity therebetween when the spring 64 urges the annular member 61 into engagement with the seat 62. It will be noted that the coils 67 of the torsion spring 48 circumscribe the elongated member 58 and that one end 69 of the spring 48 engages the lever 42 and that the other end 71 of lever 42 engages the caliper housing.

The annular member 61 threadedly receives an adjuster member 72. When either of the members 61 or 72 are rotated relative to one another, the member 72 extends from the annular member 61 or retracts into the latter, depending upon the direction of relative rotation therebetween. The adjuster member 72 includes a radially extending portion 74. A bearing 76 is interposed between a washer 78 carried by the piston 32 and the radially extending portion 74. The threads interconnecting the members 61 and 72 are so designed that there is a clearance between the threads on the members 61 and 72 allowing small axial movement between the members so that when a force acting in the direction of the Arrow A acts upon the radially extending portion 74 of member 72, the latter will be rotated in a direction extending the adjuster member 72 from the annular member 61.

The inner circumferential surface of a washer 80 is provided with splines generally indicated by the numeral 82 which engage corresponding splines provided on the member 61. A bolt 84 extends through the wall of the housing 20 and engages one side of the washer 80, thereby urging the other side of the washer 80 into frictional engagement with a wall of the housing 20, to prevent rotation of the washer 80 relative to the housing. Because of the splined connection 82 between the washer 80 and the annular member 61, the latter is also prevented from rotating. However, if the bolt 84 is loosened or removed thereby freeing the washer 80, the member 61 will be able to rotate relative to the housing 20.

DESCRIPTION OF THE ALTERNATE EMBODIMENT

Figure 4:
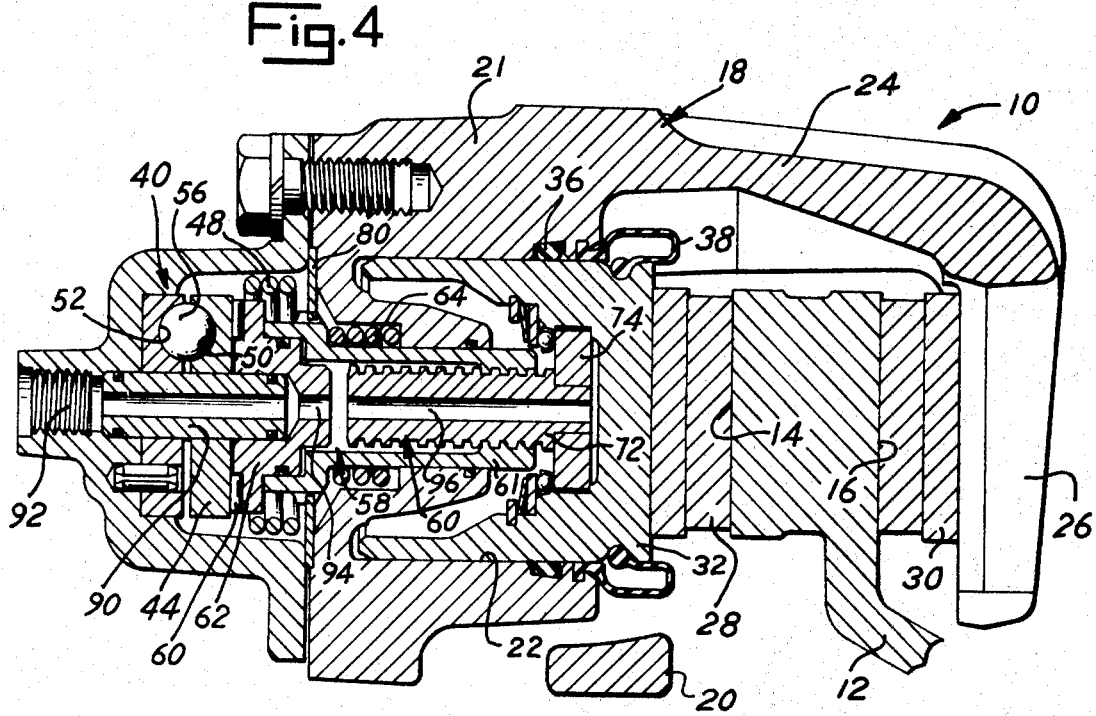
FIG. 4 is a view similar to FIG. 1 but illustrating an alternate embodiment of my invention.

In the alternate embodiment of FIG. 4, elements substantially the same as those in the preferred embodiment retain the same reference character. In FIG. 4, end 44 of the lever 42 pivots about a tubular member 90, which is sealingly supported by the housing 21 and by the portion 62 of the elongated member 58. An inlet port 92 is provided in the end of the housing 21 to communicate fluid to the left side the piston 32 through the tubular member 90, and passages 94 and 96 through the elongated member 58 and adjuster member 72. The construction illustrated in FIG. 4 permits the length of the housing 21 to be substantially reduced.

MODE OF OPERATION

When a service brake application is effected, pressurized brake fluid is admitted from the standard master cylinder of the automobile (not shown) through the inlet ports 34 or 92 into the bore 22. Fluid pressure acts on the end of the piston 32, urging the latter toward the rotor 12. Movement of the piston 32 urges the friction element 28 into braking engagement with the friction face 14 of the rotor. Because the caliper 18 is slidably mounted on the torque member 20, reaction forces acting through the bridge portion 24 and the inwardly extending portion 26 of the caliper 18 also urge the friction element 30 into braking engagement with the friction face 16.

As is well known to those skilled in the art, repeated brake applications will cause wear of the friction element 28 and 30 thereby increasing the stroke of the piston 32 required to effect a brake application unless an automatic adjuster is provided to limit the retraction of the piston 32 to a predetermined constant distance. In the brake disclosed in the present application, movement of the piston 32 toward rotor 12 in excess of a predetermined distance causes the washer 78 to apply a force acting in the direction of the Arrow A to the member 72. The bearing 76 interposed between the washer 78 and the radially extending portion 74 permits rotation of the latter relative to the piston 32 as described herein above. Rotation of the member 72 extends the latter from the member 61. When the brake is released, the piston can retract only until the clearance is taken up between the threads interconnecting the annular member 61 and the adjuster member 72. Rotation of the member 72 in the opposite direction to retract the latter into the annular member 61 is prevented because the rim 86 on the rear face of the piston 32 frictionally engages the portion 74 when the brakes are released, thereby preventing the latter from turning. Details of the construction and operation of this automatic adjuster are more completely described in U. S. Pat. application Ser. No. 38,459 filed May 18, 1970, owned by the assignee of the present invention and incorporated herein by reference.

It is desirable to limit operation of an automatic adjuster to relatively low fluid pressure levels within the bore 22, since elastic deflection of the caliper and other brake members during a high pressure or "panic" brake application may cause the automatic adjuster to over-adjust, thereby causing the friction elements 28 and 30 to drag against the friction faces 14 and 16. For this reason, a compensator is provided in the present design to limit operation of the automatic adjuster to relatively lower pressure brake application. Fluid admitted into the inlet 34 is also communicated to the annular chamber defined between the shoulders 66 and 68 on the portions 60 and 61 of the elongated member 58. As long as the forces due to fluid pressure acting on the annular surface of the shoulder 66 is less than the force exerted on the member 61 by the spring 64, the annular member 61 will not move and the automatic adjuster mechanism operates as described above. However, when a fluid pressure level in the chamber between the shoulder 66 and 68 acting on the annular surface defined by the shoulder 66 exceeds the force exerted by the spring 64, fluid pressure acting on the shoulder 66 urges the members 61 and 72 to the right viewing FIG. 1, as the piston 32 is urged to the right. Since the piston 32 does not move relative to the annular member 61, the washer 78 will not apply an axially directed force to the member 72 and the latter will not rotate to extend from the member 61, thereby preventing adjustment of the brake when a high pressure brake application is effected.

As described hereinabove, the adjuster member 72 does not retract within the annular member 61 when the piston 32 moves to the left (viewing FIG. 1) when the brakes operate normally. However, it is desirable when the brake is serviced to be able to force the piston 32 away from the friction face 14. This is accomplished by loosening the bolt 84 to permit the washer 80, and therefore, the member 61, to rotate relative to the housing 21. When this is done the piston may be pushed to the left viewing FIG. 1. Although the member 72 cannot rotate because of the frictional engagement between the radially extending portion 74 of the latter with rim 86 on the piston, the member 61 rotates since the washer 80 no longer is frictionally engaged with the wall of the housing. As the piston 32 is moved to the left, the threads interconnecting the sections 72 and 61 cause the latter to rotate thereby retracting the section 72 against the section 61 to prevent movement of the piston 32 away from the friction face 14, without completely disassembling the brake.

When a parking application is effected, the cable 46 is moved to rotate the lever 42 from the first position illustrated by the solid lines in FIG. 2 to the second position illustrated by the phantom lines in FIG. 2. As is illustrated in FIG. 5, the recesses 50 and 52 are in substantial axial alignment when the lever is disposed in the first or brake released position, but as the parking lever 42 is moved toward the second or brake-applied position, the recesses 50 are moved out of alignment with their corresponding recesses 52. Therefore, the spheres 56 are urged up the ramps 55 and 57, thereby urging the lever in an axial direction toward the rotor 12. Axial movement of the lever 42 is transmitted to the piston 32 by the elongated member 58. Therefore, as the lever 42 is rotated, the friction element 28 will be urged into braking engagement with the friction face 14. Because of the reaction forces acting through the portions 24 and 26 of the caliper 18, as the piston 32 is moved toward the friction face 14, the friction element 30 will also be urged into braking engagement with the friction face 16, thereby effecting a brake application.

Referring to FIG. 5, it will be noted that the slope of the ramps 55 is much greater than that of the ramp 57. Therefore, the lever 42 moves a substantial distance axially when the latter is rotated a very small amount to permit "slack" due to clearances in the various components to be removed very quickly. As rotation of the lever 42 continues, the spheres 56 are urged up the ramp 57 to urge the friction element 28, 30 against their corresponding friction faces 14, 16, with high force multiplication.

When the parking lever is released, the spring 48 urges the lever 42 toward the first position. When this occurs, the spheres 56 fall back into their corresponding dish-shaped recesses 53. The spring 64 then urges the elongated member 58 and the lever 40 as a unit to the left viewing FIG. 1. When this occurs, the seal 36 urges the piston 32 away from the rotor 12, to release the brake 10.

We claim:

1. In a disc brake:
a torque member;
a rotor having a pair of opposed friction faces;
a pair of friction elements, one of said elements being disposed adjacent each of said friction faces;
a caliper housing slidably mounted on said torque member straddling said rotor and operatively connected to each of said friction elements;
said caliper housing defining a bore therewithin;
a piston slidably mounted in said bore for movement toward and away from said rotor to urge said friction elements into braking engagement with their corresponding friction faces when pressurized fluid is admitted into said bore;
an extendible member slidably mounted in said bore to limit retraction of the piston to a predetermined distance;
said extendible member including first and second relatively rotatable members, one of said members extending axially from the other member upon relatively rotation of the members in a first direction, but retracting into the other member upon relative rotation between the members in the other direction;
said one member being operably connected to said piston, said piston being adapted to rotate said one member in said first direction upon movement of the piston toward the rotor;
means preventing rotation of said one section upon movement of the piston away from said rotor; and
releasable means preventing rotation of said second member, said releasable means permitting retraction of said first member into the second member upon release of said releasable means when the brake is serviced.

2. The invention of claim 1:
said releasable means including an annular member circumscribing said second member, said annular member being connected to said second member to permit relative axial movement therebetween but to prevent relative rotation between the annular member and the second member, and a fastener securing said annular member to said housing to prevent relative movement with respect thereto.

3. In a disc brake:
a torque member;
a rotor having a pair of opposed friction faces;
a pair of friction elements, one of said element being disposed adjacent each of said friction faces;
a caliper housing member slidably mounted on said torque member straddling said rotor and operatively connected to each of said friction elements;
said caliper housing member defining a bore therewithin;
a piston slidably mounted in said bore for movement toward and away from said rotor to urge said friction elements into braking engagement with their corresponding friction faces when pressurized fluid is admitted into said bore;
a lever wholly enclosed within said caliper housing member, said lever being rotatable about an axis generally parallel to the axis of said rotor from a brake released position to a brake actuated position;
a cable secured to said lever and extending from said housing member for actuating said lever;
stop means within said housing member;
said brake released position being defined by engagement of said lever with said stop means;
resilient means wholly enclosed within said housing member yieldably urging said lever into engagement with said stop means;
an elongated member slidably mounted in said housing member and extending between said lever and said piston; and
force transmitting elements disposed between one of said members and said lever for urging said elongated member and said piston toward the rotor when said lever is rotated toward the actuated position.

4. The invention of claim 3:
said lever and said one member having mating recesses receiving said force transmitting elements;
the recesses in the lever being in substantial alignment with the recesses in said one member when the lever is disposed in the brake released position, the recesses in the lever being displaced from the recesses in said one member when the lever is rotated toward the brake actuated position thereby urging said force transmitting elements up the sides of the recesses to thereby urge the elongated member and said piston toward the rotor.

5. The invention of claim 4:

said resilient means being a torsional spring having at least one coil circumscribing said elongated member, and a pair of arms extending from said coil, one of said arms engaging said lever, the other arm engaging said housing member.

* * * * *